United States Patent
Bengtsson et al.

(10) Patent No.: US 10,136,314 B2
(45) Date of Patent: *Nov. 20, 2018

(54) BCC ENABLED KEY MANAGEMENT SYSTEM

(71) Applicant: Sony Corporation, Tokyo (JP)

(72) Inventors: Henrik Bengtsson, Lund (SE); Aleksandar Rodzevski, Malmo (SE); Anders Mellqvist, Malmo (SE); Carl-Johan Weiderstrand, Lomma (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/542,970

(22) PCT Filed: Jul. 8, 2015

(86) PCT No.: PCT/IB2015/055156
§ 371 (c)(1),
(2) Date: Jul. 12, 2017

(87) PCT Pub. No.: WO2016/113604
PCT Pub. Date: Jul. 21, 2016

(65) Prior Publication Data
US 2018/0020345 A1     Jan. 18, 2018

Related U.S. Application Data

(63) Continuation of application No. 14/598,573, filed on Jan. 16, 2015, now abandoned.

(51) Int. Cl.
*H04M 1/66* (2006.01)
*H04W 12/04* (2009.01)
(Continued)

(52) U.S. Cl.
CPC ............ *H04W 12/04* (2013.01); *G06F 1/163* (2013.01); *G07C 9/00309* (2013.01);
(Continued)

(58) Field of Classification Search
CPC ........... H04M 1/7253; H04M 2250/02; H04M 2215/32; H04M 15/58; H04M 15/745;
(Continued)

(56) References Cited

U.S. PATENT DOCUMENTS 6,580,356 B1   6/2003   Alt et al.
7,202,773 B1   4/2007   Oba et al.
(Continued)

FOREIGN PATENT DOCUMENTS

EP   2018038   1/2009
EP   2378748   10/2011
(Continued)

OTHER PUBLICATIONS

Bionym, "The Nymi White Paper", Nov. 19, 2013.
Search Report for corresponding International application No. PCT/IB2015/055156, dated Nov. 19, 2015.

*Primary Examiner* — Nimesh Patel
(74) *Attorney, Agent, or Firm* — Renner Otto Boisselle and Sklar

(57) ABSTRACT

A system with a wireless communication device and one or more wearable communication devices utilizing Body coupled communication, BCC, technology for managing digital keys to a lock. The key management system comprises a wireless communication device and at least one wearable communication device, for managing digital keys, wherein the wireless communication device and the wearable communication device are Body Coupled Communication, BCC, enabled. The method comprises receiving, in the wireless communication device, one or more digital keys
(Continued)

to a lock from an external server, detecting, in the wireless communication device, one or more wearable communication devices using BCC, sending, using BCC, the one or more digital keys from the wireless communication device to the detected one or more wearable communication devices and receiving, using BCC, the one or more digital keys from the wireless communication device in the one or more wearable communication devices, thereby enabling the wearable communication device to open the lock.

12 Claims, 7 Drawing Sheets

(51) Int. Cl.
    *G06F 1/16*         (2006.01)
    *G07C 9/00*         (2006.01)
    *H04W 12/08*      (2009.01)

(52) U.S. Cl.
    CPC ........ *G07C 9/00571* (2013.01); *H04W 12/08* (2013.01); *G07C 2009/00809* (2013.01); *G07C 2009/00865* (2013.01)

(58) Field of Classification Search
    CPC .. H04M 15/8016; H04M 1/05; H04M 1/6066; H04M 1/72519; H04M 1/72572; H04M 2215/2026; H04M 2215/7414; H04M 2250/12; H04M 1/6041; H04W 12/06; H04W 4/008; H04W 4/02; H04W 88/02; H04W 68/005; H04W 4/021; H04W 4/023; H04W 4/027; H04W 4/028; H04W 76/023; H04W 12/04; H04W 12/08; H04W 24/02; H04W 40/244; H04W 4/005; H04W 4/206
    See application file for complete search history.

(56) References Cited

U.S. PATENT DOCUMENTS

| | | | |
|---|---|---|---|
| 9,578,504 B2* | 2/2017 | Weast | .................. H04W 12/06 |
| 9,667,353 B2* | 5/2017 | Åstrand | ............... H04B 13/005 |
| 2002/0068600 A1* | 6/2002 | Chihara | .................. H04B 1/385 |
| | | | 455/557 |
| 2005/0008148 A1 | 1/2005 | Jacobson | |
| 2005/0243061 A1 | 11/2005 | Liberty et al. | |
| 2006/0028429 A1* | 2/2006 | Kanevsky | ............... G06F 3/011 |
| | | | 345/156 |
| 2006/0255963 A1* | 11/2006 | Thompson | ............. G08C 17/02 |
| | | | 340/12.23 |
| 2007/0145119 A1 | 6/2007 | Rhelimi | |
| 2007/0282783 A1 | 12/2007 | Singh | |
| 2009/0051649 A1* | 2/2009 | Rondel | .................... G06F 1/163 |
| | | | 345/156 |
| 2009/0094681 A1 | 4/2009 | Sadler et al. | |
| 2009/0249478 A1* | 10/2009 | Rosener | .................. G06F 21/31 |
| | | | 726/19 |
| 2010/0277435 A1 | 11/2010 | Han et al. | |
| 2011/0022196 A1* | 1/2011 | Linsky | .................... G06F 1/163 |
| | | | 700/85 |
| 2011/0205156 A1 | 8/2011 | Gomez et al. | |
| 2012/0026129 A1 | 2/2012 | Kawakami | |
| 2012/0171958 A1* | 7/2012 | Cornett | ................. H04W 4/008 |
| | | | 455/41.2 |
| 2012/0249409 A1 | 10/2012 | Toney et al. | |
| 2012/0324368 A1 | 12/2012 | Putz et al. | |
| 2013/0017789 A1 | 1/2013 | Chi et al. | |
| 2013/0174049 A1 | 7/2013 | Townsend et al. | |
| 2014/0085050 A1 | 3/2014 | Luna | |
| 2014/0120905 A1 | 5/2014 | Kim | |
| 2014/0325614 A1 | 10/2014 | Rhelimi | |

FOREIGN PATENT DOCUMENTS

| | | |
|---|---|---|
| EP | 2600319 | 6/2013 |
| JP | 2008 073462 | 4/2008 |
| JP | 2009 049951 | 3/2009 |
| WO | 2011/021531 | 2/2011 |
| WO | 2013 188977 A2 | 12/2013 |
| WO | 2015 083126 A1 | 6/2015 |

* cited by examiner

BCC ENABLED KEY MANAGEMENT SYSTEM

TECHNICAL FIELD

The present disclosure relates generally to a system with a wireless communication device and wearable communication devices, and particularly to a system, devices and methods equipped with, and utilizing Body coupled communication, BCC, technology for managing digital keys to a lock.

RELATED APPLICATION DATA

This application is a national phase of International Application No. PCT/IB2015/055156 filed Jul. 8, 2015 and published in the English language, which claims priority to U.S. non-provisional application Ser.No. 14/598,573 filed on Jan. 16, 2015 , which is hereby incorporated in its entirety by reference.

BACKGROUND ART

There is an emerging consumer market for certain devices that are used as companion products to smartphone devices. Their popularity can be traced, in part, to the variety of features they provide to a user. For example, one such device is a wearable device, such as a ring worn on the user's finger, a necklace, glasses, or a "wristlet" (e.g., a watch or wristband) that is worn around a user's wrist. Typically, such wearable devices may provide different features, such as a logging function that monitors the user's motion and resting activities, and then sends a report on the detected motion and activities to the user's smartphone for storage in memory. Another feature allows the wearable devices to be used as a personal token to automatically gain access to a smartphone that has been locked. Particularly, a wearable device worn by the user may communicate with the user's smartphone, thereby permitting the user to bypass the manual entry of a predetermined unlock sequence associated with the smartphone.

Such features are already present on commercial products/devices. However, a common issue associated with these devices is that they either need a physical interface (e.g. a 3.5 mm audio plug, an Universal Serial Bus (USB), etc.) or some sort of wireless "local connectivity" (e.g., BLUETOOTH, WiFi, Near Field Communication (NFC), etc.), in order to transmit data between the devices. Such methods for communicating, however, can be cumbersome. Additionally, these types of communication may be a limiting factor that could constrain new features waiting to be implemented on such devices.

There are existing solutions utilizing such local connectivity technologies such as BLUETOOTH/BLE and WiFi in order to detect a wristlet in close proximity to a smartphone.

Most locks have physical keys, which can get lost. Furthermore, physical keys are limited in number so that it can pose a problem for a family to lend a key to someone else. Some doors have cards that can open doors, as in hotels, but they can get lost and be stolen, and are not suited for private purpose. There is a need to improve the usability of keys and make them more user friendly for everyone. Furthermore, there is a need to ensure the security of handling the keys.

SUMMARY

With the above description in mind, then, an aspect of the present invention is to provide methods and a system with devices which manage digital keys, which seek to mitigate, alleviate, or eliminate one or more of the above-identified deficiencies in the art and disadvantages singly or in any combination.

These and further objects are achieved by a system, devices and methods equipped with, and utilizing Body coupled communication, BCC, technology. The disclosure provides for a system, methods and devices for managing digital keys to a lock.

The present disclosure is defined by the appended claims. Various advantageous embodiments of the disclosure are set forth by the appended claims as well as by the following description and the accompanying drawings.

According to some aspects the disclosure provides for a method performed in a key management system comprising a wireless communication device and at least one wearable communication device, for managing digital keys, wherein the wireless communication device and the wearable communication device are Body Coupled Communication, BCC, enabled.

According to some aspects, the method comprises receiving, in the wireless communication device, one or more digital keys to a lock from an external server, detecting, in the wireless communication device, one or more wearable communication devices using BCC, sending, using BCC, the one or more digital keys from the wireless communication device to the detected one or more wearable communication devices and receiving, using BCC, the one or more digital keys from the wireless communication device in the one or more wearable communication devices, thereby enabling the wearable communication device to open the lock. By performing the above steps, a way to securely distribute keys is provided. BCC is used to ensure that body contact is required for distributing keys. The method also provides that a user can utilize any wearable communication device as a key to a lock to e.g. his/her house. An example of use is when a user goes to his/her summer house and brings a wearable communication device in the form of a wristlet, the user can then put a digital key to the summer house in the wristlet and access the house using only that. Another example of use is when a user puts digital keys to his/her home on the wearable devices of his/her children so that they can access the house at any time. Of course, the lock to be opened is required to be equipped with some kind of Near Field Communication means so that it can receive the key from the wearable communication device upon unlocking.

According to some aspects, the method comprises that the user of the wireless communication device is different from, or the same as, a user of the wearable communication device. When the users are the same, the owner of the key can distribute his/her keys to his/her wearables to customize his/her use of the key. When the users are different, the owner of the keys can distribute his/her digital keys as described in the previous paragraph or to e.g. guests in his/her house.

According to some aspects, the sending of the one or more digital keys to the detected one or more wearable communication devices comprises one of, or any combination of: sending one digital key to one wearable communication device, sending each one or more digital keys to separate wearable communication devices, sending several digital keys to one wearable communication device and/or sending one digital key to several wearable communication devices. In other words, the method is flexible in regards to how many keys are sent to which wearable communication device.

According to some aspects the disclosure provides for a key management system comprising a wireless communication device and at least one wearable communication device. The wireless communication device is Body Coupled Communication, BCC, enabled, and comprises communication circuitry and processing circuitry. The processing circuitry is configured to receive, via the communication circuitry, one or more digital keys to a lock from an external server, to detect one or more wearable communication devices using BCC and to send, using BCC, via the communication circuitry, the one or more digital keys from the wireless communication device to the detected one or more wearable communication devices. Furthermore, the at least one wearable communication device is Body Coupled Communication, BCC, enabled, and comprises communication circuitry and processing circuitry. The processing circuitry is configured to receive (S7), using BCC, via the communication circuitry, the one or more digital keys from the wireless communication device in the one or more wearable communication devices, thereby enabling the wearable communication device to open the lock. The advantages to the system have been discussed when discussing the method above.

According to some aspects the disclosure provides for a method performed in a Body Coupled Communication, BCC, enabled wireless communication device for managing digital keys. The method comprises receiving one or more digital keys to a lock from an external server, detecting one or more wearable communication device using Body Coupled Communication, BCC and sending, using BCC, the one or more digital keys from the wireless communication device to the detected one or more wearable communication devices. Thus, the method for distributing the keys is provided in the wireless communication device. Using BCC as communication means for the keys ensures that the distribution is private.

According to some aspects, the method comprises authenticating a user of the wireless communication device in the wireless communication device and connecting to an external server. The user is authenticated so that it is confirmed that the user using the wireless communication device is allowed to handle the digital keys he/she is receiving from the external server.

According to some aspects, the authenticating comprises to determine that the user has the right to manage a specific digital key. In other words, the authenticating is for example to enter a code only known by the user with the right to manage a specific digital key or a set of specific digital keys.

According to some aspects, the sending is automatically performed upon detecting the one or more wearable communication device using BCC. In other words, the one or more digital keys are distributed automatically when the user puts on a wearable communication device.

According to some aspects, the method comprises receiving input from the user of the first wireless communication device to send the digital key to the one or more wearable communication device. This may be used to ensure control for the user of which digital keys are sent to what wearable communication device.

According to some aspects, the external server is a Trusted Service Manager, TSM. The server is thus a secure server and the keys are securely received in the wireless communication device.

According to some aspects, the authenticating of the user comprises any one or several of: fingerprint authentication, voice authentication and/or passcode authentication. Any authentication method which ensures the identity of the user may be used.

According to some aspects the disclosure provides for a Body Coupled Communication, BCC, enabled wireless communication device, comprising communication circuitry and processing circuit. The processing circuitry is configured to receive, via the communication circuitry, one or more digital keys to a lock from an external server, to detect one or more wearable communication devices using BCC and to send, using BCC, via the communication circuitry, the one or more digital keys from the wireless communication device to the one or more wearable communication devices. The advantages have been previously discussed.

According to some aspects the disclosure provides for a method performed in a Body Coupled Communication, BCC, enabled wearable communication device. The method comprise broadcasting a BCC signal and receiving, via BCC, one or more digital keys to a lock from a wireless communication device thereby enabling the wearable communication device to open the lock. By broadcasting a BCC signal, the wireless communication device is able to find the wearable communication device if both devices are in contact with, or in close proximity with, the body of a user.

According to some aspects, the method comprises deleting the one or more digital keys if the wearable communication device loses contact with the body of the user of the wearable communication device. By deleting the digital keys if the wearable communication device loses body contact, a way to ensure that the digital keys are not stolen if the wearable communication device is stolen is provided.

According to some aspects the disclosure provides for a Body Coupled Communication, BCC, enabled wearable communication device, comprising communication circuitry and processing circuitry. The processing circuitry is configured to broadcast a BCC signal and to receive, via BCC, one or more digital keys to a lock from a wireless communication device, thereby enabling the wearable communication device to open the lock. The advantages have been previously described.

DESCRIPTION OF EMBODIMENTS

Figure 1:
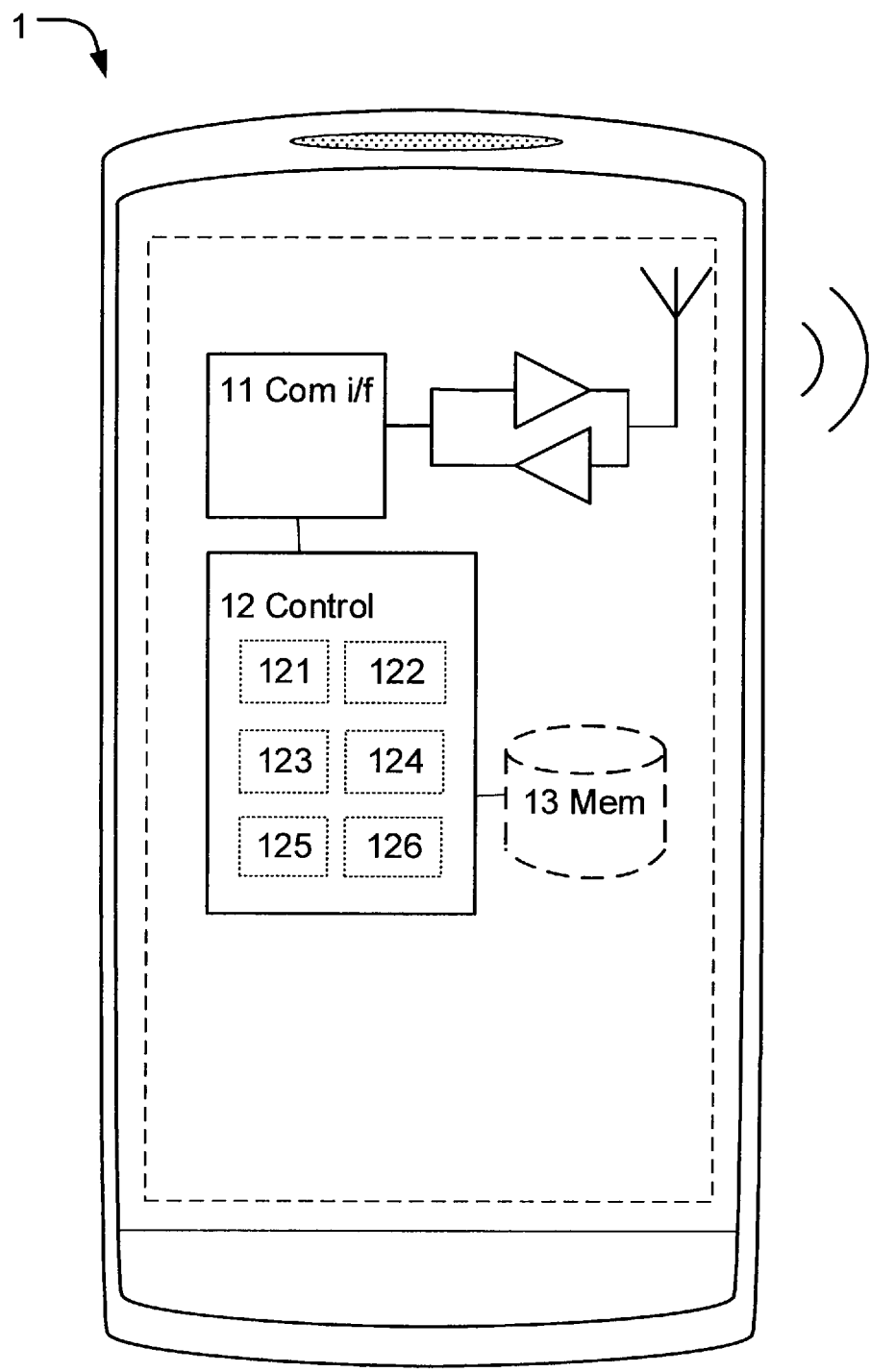
FIG. 1 illustrates an example of a wireless communication device.

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

Aspects of the present disclosure will be described more fully hereinafter with reference to the accompanying drawings. The device and method disclosed herein can, however, be realized in many different forms and should not be construed as being limited to the aspects set forth herein.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Embodiments of the present invention will be exemplified using a wireless communication device such as a mobile phone. However, it should be appreciated that the invention is as such equally applicable to any communication devices which have Body Coupled Communication, BCC, communication capabilities. Examples of such devices may for instance be any type of mobile phone, smartphone, laptop (such as standard, ultra portables, netbooks, and micro laptops), handheld computers, portable digital assistants, tablet computers, touch pads, gaming devices, accessories to mobile phones, e.g. wearable communication devices in the form of headphones/-sets, visors/goggles, bracelets, wristbands, necklaces, watches, headbands, rings, etc. It should be noted that a wireless communication device is any communication device equipped with communication means and can be e.g. a coffee machine, a lamp post or a door.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Body Coupled Communications, BCC, or also called Body-Based Communication, BBC or Near-Body Communication, NBC, has been proposed as a promising alternative to radio frequency, RF, communication as a basis for Body/Personal Area Network, BAN/PAN, communication. BCC allows for an exchange of information between a plurality of devices which are in contact with or in close proximity of a living body. This can be achieved by the transmitting BCC-/BAN-antenna that provide a capacitive or galvanic coupling of low-energy electrical fields onto the body surface, i.e. leakage currents with a small magnitude is set to spread out over the human body. The small currents are then detected by a receiver BCC antenna, located on the same body. Thus, signals are conveyed over the body instead of through the air. As such, the communication is confined to the volume close to the body in contrast to RF communications, where a much larger volume is covered. Therefore, communication is possible between devices situated on, connected to, or placed close to the body. The power consumption of BCC-antennas is very low.

BCC is no new technique, and it has previously been employed within the fields of e.g. medical sensor devices and exercise sensors. Within these fields, sensors attached to the users skin or worn in the close proximity of the body is employed for monitoring different body functions in order to keep track of medical status or fitness parameters of the user. For sending the collected data to a central unit e.g. BCC can be utilized.

FIG. 1 shows a wireless communication device according to some aspects of the disclosure. The figure illustrates a Body Coupled Communication, BCC, enabled wireless communication device 1, comprising communication circuitry 11 and processing circuit 12. The wireless communication device further comprises a memory 13 for storing data. The memory may be any type of memory suitable for a wireless communication device.

Figure 2:
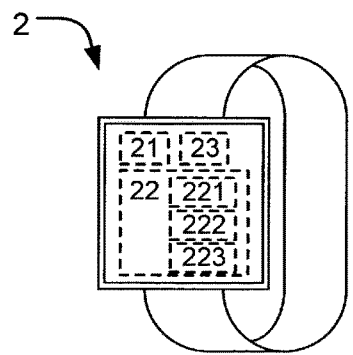
FIG. 2 illustrates an example of a wearable communication device.
Figure 3:
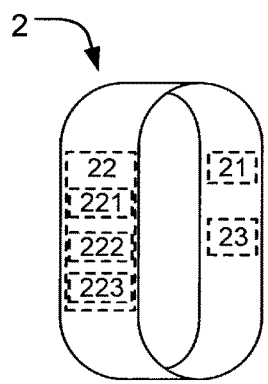
FIG. 3 illustrates an example of a wearable communication device.
Figure 4:
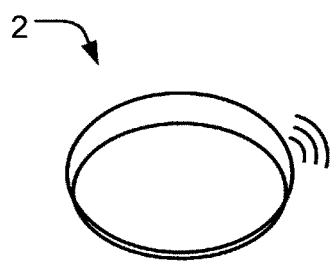
FIG. 4 illustrates an example of a wearable communication device.
Figure 5:
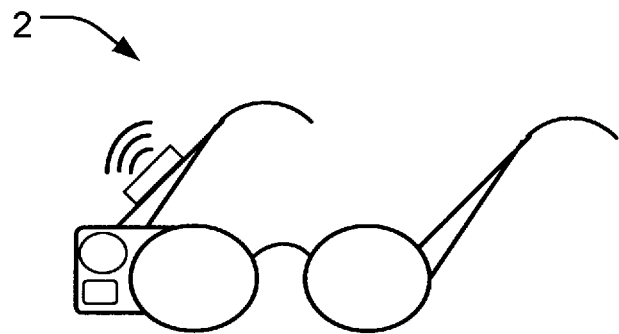
FIG. 5 illustrates an example of a wearable communication device.
Figure 6:
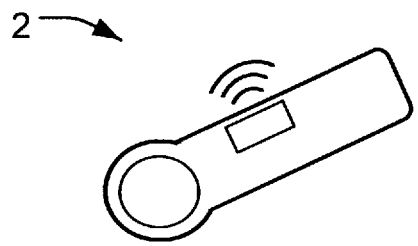
FIG. 6 illustrates an example of a wearable communication device.

FIGS. 2 to 6 shows examples of BCC enabled wearable communication devices. The wearable communication devices comprise communication circuitry 21 and processing circuitry 22. The wearable communication device further comprises a memory 23 for storing data. The memory may be any type of memory suitable for a wearable communication device. FIG. 2 is a watch, FIG. 3 is a wristlet, FIG. 4 is a ring, FIG. 5 is glasses and FIG. 6 is a headpiece.

Figure 7:
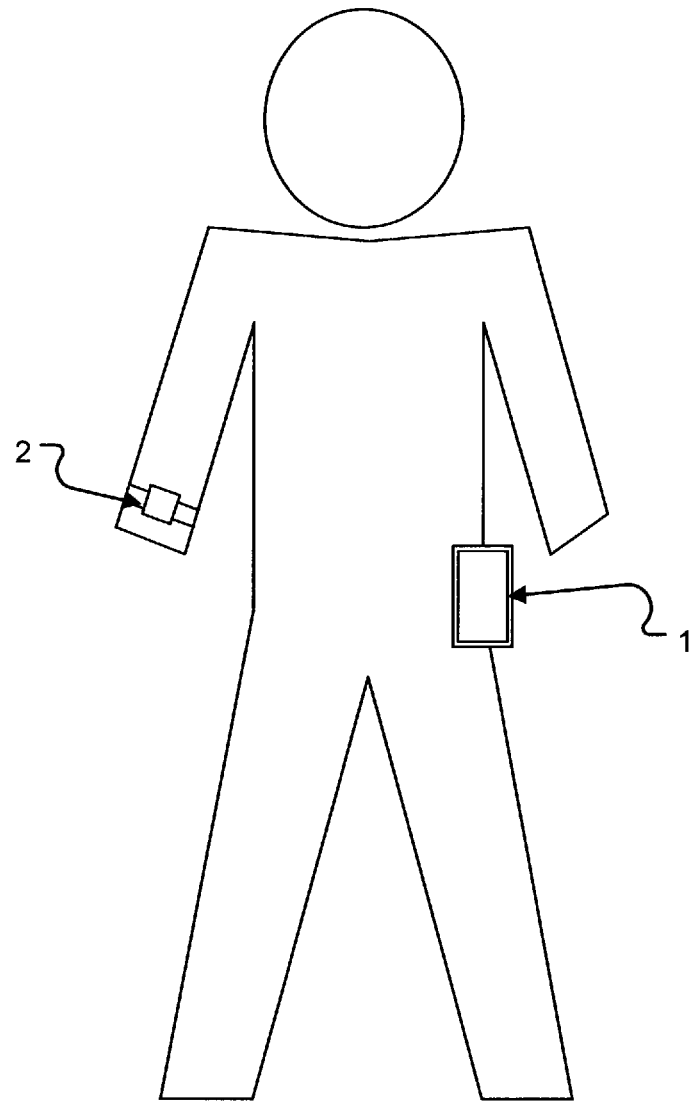
FIG. 7 illustrates a user with a wireless communication device and a wearable communication device.

A system of a wireless communication device 1 and a wearable communication device 2 is illustrated in FIG. 7. In the example in the figure the wireless communication device is a smartphone and the wearable communication device is a watch, both located on, or in the vicinity of, the body of the user.

Figure 8:
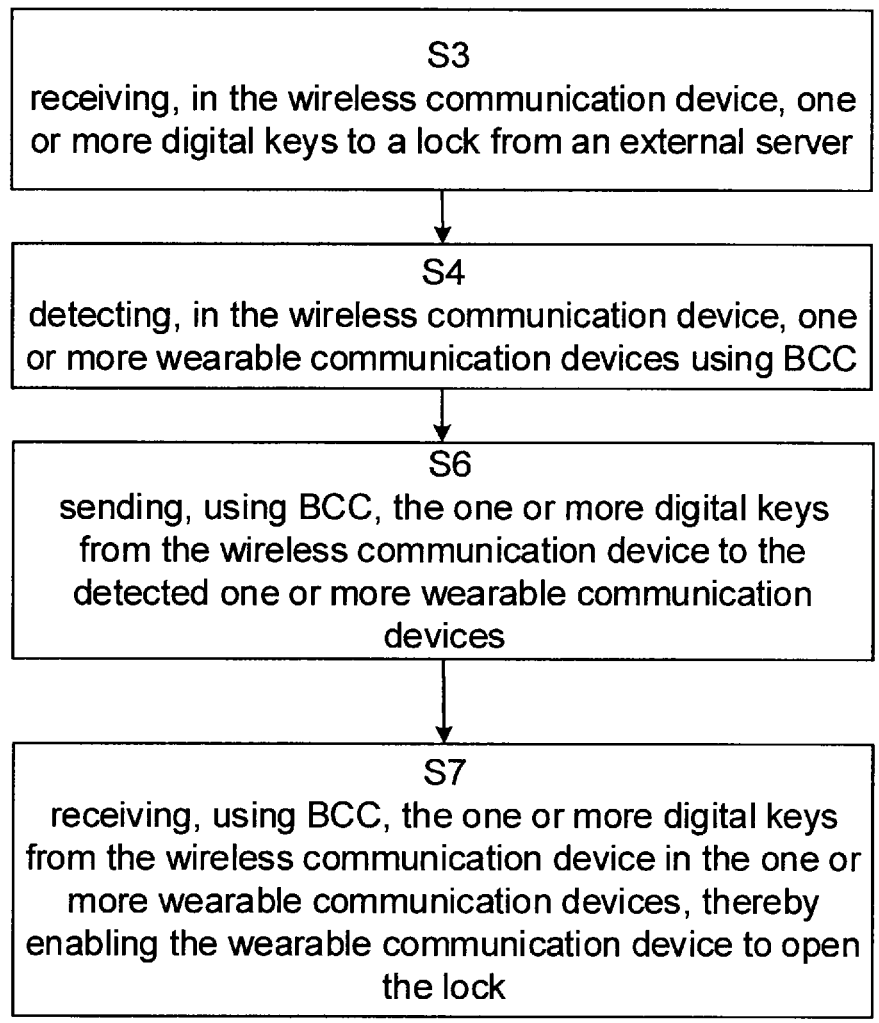
FIG. 8 is a flow chart illustrating the proposed method, performed in the key management system.
Figure 9:
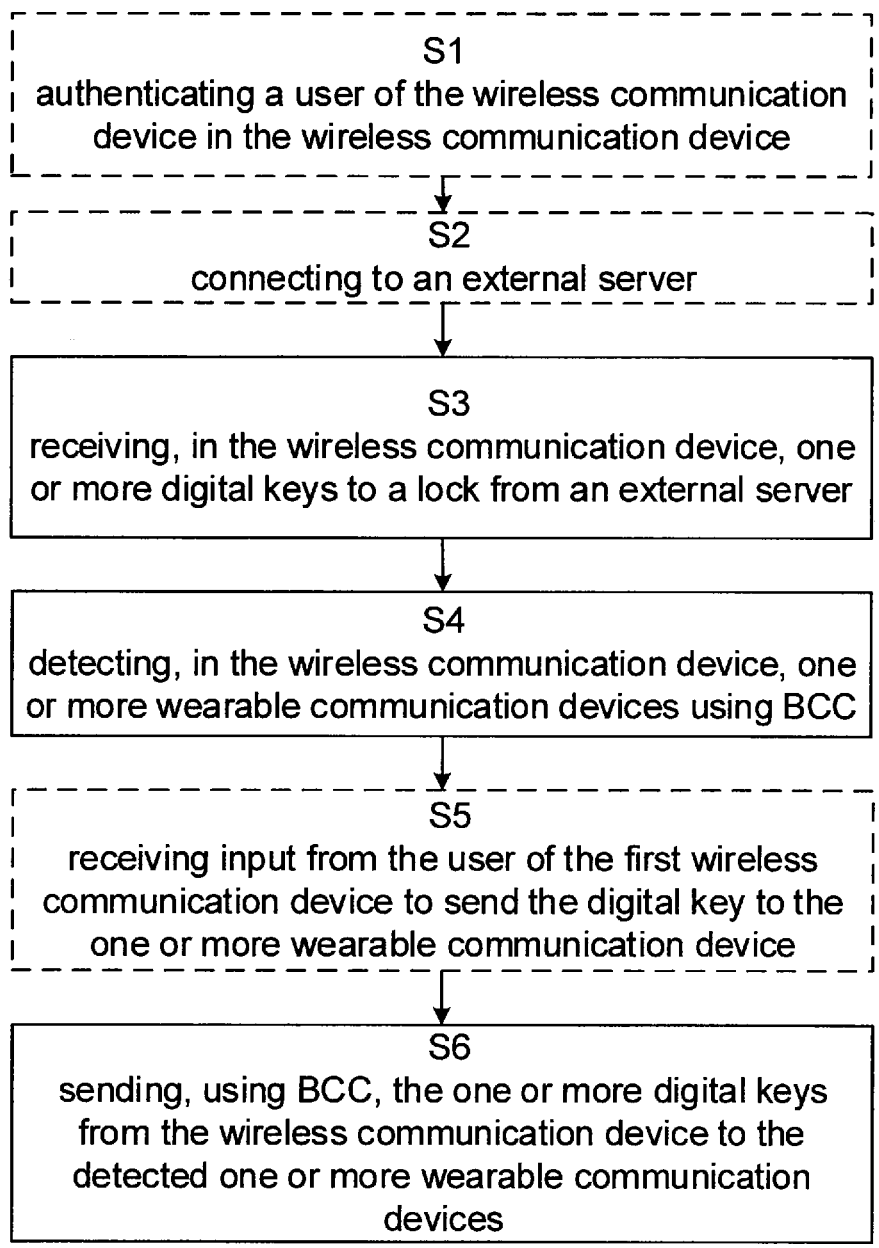
FIG. 9 is a flow chart illustrating the proposed method, performed in the wireless communication device.

FIG. 8 is a flow diagram depicting example operations which may be taken by a key management system comprising a wireless communication device 1 of FIG. 1 and at least one wearable communication device 2 of FIGS. 2-7, for managing digital keys. The wireless communication device and the wearable communication device are Body Coupled Communication, BCC, enabled. FIG. 9 specifies the steps taken by the wireless communication device 1 and FIG. 10 specifies the steps taken by the wearable communication device 2. All steps performed will be described hereafter in a logical order of the steps and not in the order of which device performs which steps.

As previously stated, the wireless communication device is Body Coupled Communication, BCC, enabled, and comprises communication circuitry 11 and processing circuitry 12. Furthermore, the at least one wearable communication device is Body Coupled Communication, BCC, enabled, and comprises communication circuitry 21 and processing circuitry 22.

According to some aspects, the method of the key management system and the wireless communication device 1 comprises authenticating S1 a user of the wireless communication device in the wireless communication device and connecting S2 to an external server. According to some aspects, the processing circuitry 12 is configured to authenticate the user. According to some aspects, the processing circuitry comprises an authenticator 121 for the authentication. The user is authenticated so that it is confirmed that the user using the wireless communication device is allowed to handle the digital keys he/she is receiving from the external server. According to some aspects, the authenticating S1 of the user comprises any one or several of: fingerprint authentication, voice authentication and/or passcode authentication. Any authentication method which ensures the identity of the user may be used. According to some aspects, the authenticating S1 comprises to determine that the user has the right to manage a specific digital key. In other words, the authenticating is for example to enter a code only known by the user with the right to manage a specific digital key or a set of specific digital keys. According to some aspects, the authentication comprises to unlock the wireless communication device. In other words, if a user is able to unlock his/her smartphone, he/she is also authenticated to handle his/her keys. The authentication may be performed using a fingerprint scanner or a voice recognizer. According to some aspects, the processing circuitry 12 is configured to connect S2 to an external server using the communication circuitry 11. According to some aspects, the processing circuitry comprises a connector 122 for the connection S2. According to some aspects, the authentication is done after the wireless communication device has connected to the external server by e.g. logging on to the server using a code, fingerprint or voice.

The method of the key management system and the wireless communication device 1 comprises receiving S3, in the wireless communication device, one or more digital keys 3 to a lock from the external server. The processing circuitry 12 is configured to receive S3, via the communication circuitry, the one or more digital keys 3 to a lock from the external server. According to some aspects, the processing circuitry 12 comprises a receiver 123 for performing the receiving step S3. According to some aspects, the external server is a Trusted Service Manager, TSM. The server is thus a secure server and the keys are securely received in the wireless communication device. The external server may also be any server from where digital keys can be received. The one or more digital keys may be usable for one or several locks. The locks may be physical locks or digital locks. A physical lock is for example a lock on a door or port, a padlock or a car lock. When the lock is a digital lock, the digital key is for example a key to access a bank account or to access a computer or any type of communication device.

The method of the key management system and the wireless communication device 1 further comprises detecting S4, in the wireless communication device, one or more wearable communication devices using BCC. The processing circuitry 12 is configured to detect S4 one or more wearable communication devices using BCC. According to some aspects, the processing circuitry 12 comprises a detector 124 for detecting S4. When BCC is activated in a communication device it will search for other devices using BCC. If two devices are present on, or in close vicinity of, a user's body, they will detect each other if both have BCC activated.

According to some aspects the wearable communication device 2 broadcasts S21 a BCC signal. The processing circuitry 22 of the Body Coupled Communication, BCC, enabled wearable communication device is configured to broadcast S21 the BCC signal According to some aspects, the processing circuitry comprises a broadcaster 221 for broadcasting. By broadcasting a BCC signal in the wearable communication device 2, the wireless communication device 1 is able to find the wearable communication device if both devices are in contact with, or in close proximity with, the body of a user. It may also be that case that two users are touching, e.g. shaking hands, and the signal is sent over two bodies of two users.

When the wireless communication device 1 has detected one or more wearable communication devices 2 it will send S6, using BCC, the one or more digital keys from the wireless communication device to the detected one or more wearable communication devices. The processing circuitry 12 is configured to send S6 the one or more digital keys from the wireless communication device to the detected one or more wearable communication devices. According to some aspects, the processing circuitry 12 comprises a sender 125 for sending S6. According to some aspects, the sending comprises one of, or any combination of: sending one digital key to one wearable communication device, sending each one or more digital keys to separate wearable communication devices, sending several digital keys to one wearable communication device and/or sending one digital key to several wearable communication devices. In other words, the method is flexible in regards to how many keys are sent to which wearable communication device. Hence, one digital key may be sent to one or several wearable communication devices, two or more digital keys may be sent to one wearable communication device and two or more digital keys may be sent to two or more wearable communication devices. Which keys are sent to what wearable communication device is for example pre-set or chosen by the user of the wireless communication device.

Note that the digital key may be sent to the one or more wearable communication devices 2 without pairing of the wireless communication device 1 and the wearable communication device beforehand. Of course, if the devices are already paired that is not a problem. According to some aspects, it may be required that the devices are paired before sending as a security measure to make sure that the wearable device is already known to the user. Thus, the method for distributing the keys is provided in the wireless communication device. Using BCC as communication means for the keys ensures that the distribution is private.

According to some aspects, the sending S6 is automatically performed upon detecting the one or more wearable communication device 2 using BCC. In other words, the one or more digital keys are distributed automatically when the user puts on a wearable communication device. The automatic sending is for example pre-chosen by the user, that is, the user has made a setting in his/her wireless communication device that a digital key is to be sent automatically. The settings may be different for different keys. One setting is for example that digital keys are automatically sent to known wearable devices but not to others. One setting is for example that one digital key is to be sent automatically to a watch of the user and another digital key is to be sent automatically to a wristlet of a child of the user. According to some aspects, the method comprises receiving S5 input from the user of the first wireless communication 1 device to send the digital key to the one or more wearable communication device 2. The processing circuitry 12 is configured to receive S5 the input. According to some aspects, the processing circuitry comprises a receiver 126 for receiving the input. This may be used to ensure control for the user of which digital keys are sent to which wearable communication device. It should be noted that some digital keys may be sent automatically and some digital keys may be sent after input from the user. According to some aspects the user receives a message on a display of the wireless communication device when a wearable communication device has been detected, asking whether to send one or more digital keys or not.

The sending S6 of the one or more digital keys from the wireless communication device 1 is received S7, using BCC, in the one or more wearable communication devices 2, thereby enabling the wearable communication device to open the lock. The processing circuitry 22 of the wearable communication device is configured to receive S7, via the communication circuitry 21, the one or more digital keys to the lock from the wireless communication device. According to some aspects the processing circuitry 22 comprises a receiver 222 for receiving.

By performing some of, or all off, the above steps, a way to securely distribute keys is provided. BCC is used to ensure that body contact is required for distributing keys. The method also provides that a user can utilize any wearable communication device as a key to a lock to e.g. his/her house. An example of use is when a user goes to his/her summer house and brings a wearable communication device in the form of a wristlet, the user can then put a digital key to the summer house in the wristlet and access the house using only that. Another example of use is when a user puts digital keys to his/her home on the wearable devices of his/her children so that they can access the house at any time. Of course, the lock to be opened is required to be equipped with some form of communication means, preferably Near Filed Communication means, so that it can receive the key from the wearable communication device upon unlocking.

According to some aspects, the wearable communication device 2 performs the step of sending the key upon request from a lock. In other words, the wearable communication device holds one or more digital keys and is in communication range from a lock. The lock will then request the key from the device and the device will send the key to open the lock.

According to some aspects, the method comprises deleting S8 the one or more digital keys 3 in the wearable communication device 2 if the wearable communication device loses contact with the body of the user of the wearable communication device. The processing circuitry 22 is configured to delete S8 the one or more digital keys. According to some aspects the processing circuitry 22 comprises a delete 223 for deleting. By deleting the digital keys if the wearable communication device loses body contact, it is ensured that the digital keys are not stolen if the wearable communication device is stolen. According to some aspects the key is deleted after a user specified time limit. This may be useful if e.g. the owner of a lock with corresponding keys wishes to give another person the key to the lock over a specific time. This may be the case if the owner of a summer house lends out the house over a weekend.

According to some aspects, the method comprises that the user of the wireless communication device 1 is different from, or the same as, a user of the wearable communication device 2. When the users are the same, the owner of the key can distribute his/her keys to his/her wearables to customize his/her use of the key. When the users are different, the owner of the keys can distribute his/her digital keys as previously described or to e.g. guests in his/her house.

Figure 10:
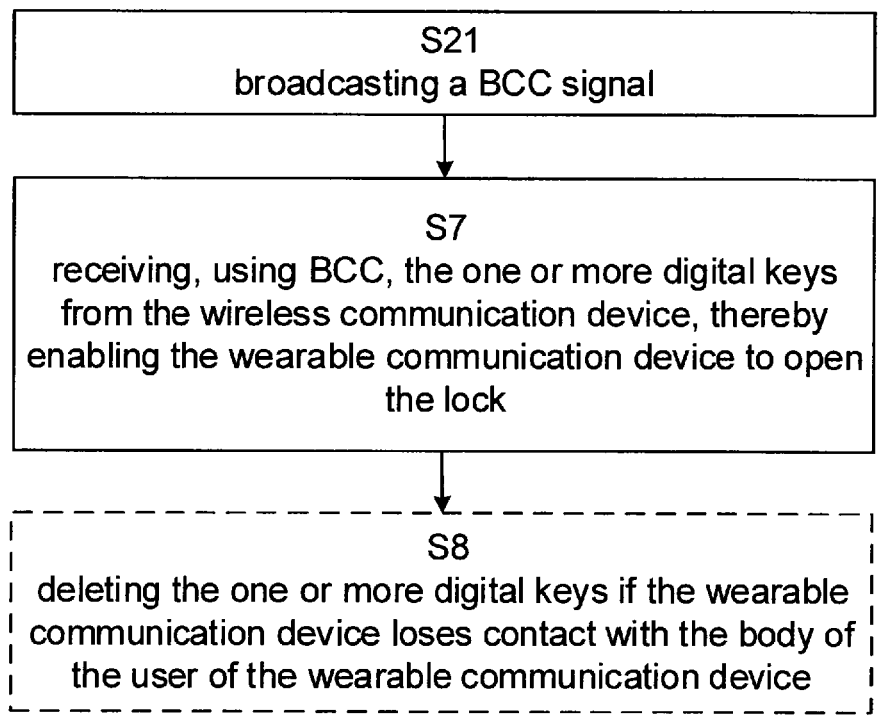
FIG. 10 is a flow chart illustrating the proposed method, performed in the wearable communication device.

It should be appreciated that the flow diagrams of FIGS. 8 to 10 comprises some operations which are illustrated with a solid border and some operations which are illustrated with a dashed border. The operations which are comprised in a solid border are operations which are comprised in the broadest aspects of the disclosure. The operations which are comprised in a dashed line are aspects of the disclosure which may be comprised in, or a part of, or are further operations which may be taken in addition to the operations of the broader aspects of the disclosure. It should be appreciated that the operations need not be performed in order. Furthermore, it should be appreciated that not all of the operations need to be performed. Also, the functions or steps noted in the blocks can according to some aspects of the disclosure be executed continuously in a loop.

The description of the aspects of the disclosure provided herein have been presented for purposes of illustration. The description is not intended to be exhaustive or to limit aspects of the disclosure to the precise form disclosed, and modifications and variations are possible in light of the above teachings or may be acquired from practice of various alternatives to the provided aspects of the disclosure. The examples discussed herein were chosen and described in order to explain the principles and the nature of various aspects of the disclosure and its practical application to enable one skilled in the art to utilize the aspects of the disclosure in various manners and with various modifications as are suited to the particular use contemplated. The features of the aspects of the disclosure described herein may be combined in all possible combinations of methods, apparatus, modules, systems, and computer program products. It should be appreciated that the aspects of the disclosure presented herein may be practiced in any combination with each other.

It should be noted that the word "comprising" does not necessarily exclude the presence of other elements or steps than those listed. It should further be noted that any reference signs do not limit the scope of the claims, that the aspects of the disclosure may be implemented at least in part by means of both hardware and software, and that several "means" or "devices" may be represented by the same item of hardware.

The various aspects of the disclosure described herein are described in the general context of method steps or processes, which may be implemented according to some aspects by a computer program, comprising computer readable code which, when run on a communication device, causes the communication device to perform the one or several of the methods according to above. The computer program, embodied in a computer-readable medium, includes computer-executable instructions, such as program code, executed by computers in networked environments. A computer-readable medium may include removable and non-removable storage devices 5 including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed aspects of the disclosure. However, many variations and modifications can be made to these aspects of the disclosure. Accordingly, although specific terms are employed, they are used in a generic and descriptive sense only and not for purposes of limitation, the scope of the aspects of the disclosure being defined by the following claims.

The invention claimed is:

1. A method performed in a key management system comprising a wireless communication device and at least one wearable communication device, for managing digital keys of at least one user-operable device that includes a lock, wherein the wireless communication device and the wearable communication device are Body Coupled Communication, BCC, enabled, the method comprises:
  receiving, in the wireless communication device, one or more digital keys to a lock of the at least one user-operable device from an external server, wherein the lock comprises at least one of a physical lock or a digital lock that is configured to deny a user access to the at least one user-operable device when in a locked state and, based on the one or more digital keys, unlock the lock and grant the user access to the at least one user-operable device;

detecting, in the wireless communication device, one or more wearable communication devices using BCC;

sending, using BCC, the one or more digital keys from the wireless communication device to the detected one or more wearable communication devices;

receiving, using BCC, the one or more digital keys from the wireless communication device in the one or more wearable communication devices, thereby enabling the wearable communication device to open the lock and gain access to the at least one user-operable device.

2. The method according to claim 1, wherein the user of the wireless communication device is different from, or the same as, a user of the wearable communication device.

3. The method according to claim 1, wherein sending the one or more digital keys to the detected one or more wearable communication devices comprises one of, or any combination of: sending one digital key to one wearable communication device, sending each one or more digital keys to separate wearable communication devices, sending several digital keys to one wearable communication device and/or sending one digital key to several wearable communication devices.

4. The method according to 1, comprising:
deleting the one or more digital keys if the wearable communication device loses contact with the body of the user of the wearable communication device.

5. A method performed in a Body Coupled Communication, BCC, enabled wireless communication device for managing digital keys of at least one user-operable device that includes a lock, the method comprising:
receiving one or more digital keys to a lock of the at least one user-operable device from an external server, wherein the lock comprises at least one of a physical lock or a digital lock that is configured to deny a user access to the at least one user-operable device when in a locked state and, based on the one or more digital keys, unlock the lock and grant the user access to the at least one user-operable device;

detecting one or more wearable communication device using Body Coupled Communication, BCC;

sending, using BCC, the one or more digital keys from the wireless communication device to the detected one or more wearable communication devices; and receiving, using BCC, the one or more digital keys from the wireless communication device in the one or more wearable communication devices, thereby enabling the wearable communication device to open the lock and gain access to the at least one user-operable device.

6. The method according to claim 5, comprising:
authenticating a user of the wireless communication device in the wireless communication device;
connecting to an external server.

7. The method according to claim 6, wherein authenticating comprises to determine that the user has the right to manage a specific digital key.

8. The method according to claim 5, wherein the sending is automatically performed upon detecting the one or more wearable communication device using BCC.

9. The method according to claim 5, comprising:
receiving input from the user of the first wireless communication device to send the digital key to the one or more wearable communication device.

10. The method according to claim 5, wherein authenticating the user comprises any one or several of: fingerprint authentication, voice authentication and/or passcode authentication.

11. The method according to claim 5, wherein the external server is a Trusted Service Manager, TSM.

12. The method according to 5, comprising:
deleting the one or more digital keys if the wearable communication device loses contact with the body of the user of the wearable communication device.

\* \* \* \* \*